United States Patent
Zhang et al.

(10) Patent No.: US 9,521,688 B2
(45) Date of Patent: Dec. 13, 2016

(54) SIGNALING FOR UPLINK SOUNDING

(75) Inventors: Haochuan Zhang, Beijing (CN); Shaohua Li, Beijing (CN); Zhenshan Zhao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 14/386,861

(22) PCT Filed: Apr. 19, 2012

(86) PCT No.: PCT/CN2012/074381
§ 371 (c)(1),
(2), (4) Date: Sep. 22, 2014

(87) PCT Pub. No.: WO2013/155692
PCT Pub. Date: Oct. 24, 2013

(65) Prior Publication Data
US 2015/0055576 A1    Feb. 26, 2015

(51) Int. Cl.
| H04L 5/00 | (2006.01) |
| H04W 72/14 | (2009.01) |
| H04W 72/04 | (2009.01) |

(52) U.S. Cl.
CPC ............ *H04W 72/14* (2013.01); *H04L 5/0048* (2013.01); *H04L 5/0053* (2013.01); *H04L 5/0094* (2013.01);
(Continued)

(58) Field of Classification Search
None
See application file for complete search history.

(56) References Cited

U.S. PATENT DOCUMENTS

| 2010/0091708 A1* | 4/2010 | Nishikawa ........ H04W 72/0413 370/328 |
| 2011/0176480 A1* | 7/2011 | Dahlman .............. H04L 5/0051 370/328 |

(Continued)

FOREIGN PATENT DOCUMENTS

| CN | 101917765 | 12/2010 |
| CN | 102165720 | 8/2011 |

(Continued)

OTHER PUBLICATIONS

3GPP TSG RAN WG1 Meeting #61bis; Dresden, Germany; Source: Huawei; Title: Control signalling design for UL MIMO (R1-103893), Jun. 28-Jul. 2, 2010.

(Continued)

*Primary Examiner* — Chi H Pham
*Assistant Examiner* — Soon-Dong D Hyun
(74) *Attorney, Agent, or Firm* — Baker Botts, LLP

(57) ABSTRACT

A method in a transmitting node in a wireless communication system for instructing a user terminal to perform uplink sounding is provided, said method comprising: generating an unlink grant in a downlink control information (DCI) for instructing the user terminal to transmit an uplink channel with only a reference signal; and transmitting the DCI with said uplink grant to the user terminal, and wherein said uplink grant is configured as a redundant state within the DCI. A method in a receiving node in a wireless communication system for performing uplink sounding is also provided.

15 Claims, 5 Drawing Sheets

S101 — generating an uplink grant in DCI to instruct the receiver to transmit an uplink channel with only a reference signal S102 — transmitting the DCI with said uplink grant to the receiver

(52) U.S. Cl.
CPC .......... *H04W 72/042* (2013.01); *H04L 5/0023* (2013.01); *H04L 5/0035* (2013.01)

(56) References Cited

U.S. PATENT DOCUMENTS

| | | | |
|---|---|---|---|
| 2011/0310818 A1* | 12/2011 | Lin ................. | H04W 72/042 370/329 |
| 2012/0069812 A1* | 3/2012 | Noh ................. | H04L 5/0091 370/329 |
| 2013/0156014 A1* | 6/2013 | Kim ................. | H04L 5/0051 370/336 |
| 2014/0321406 A1* | 10/2014 | Marinier ........... | H04B 7/024 370/329 |

FOREIGN PATENT DOCUMENTS

| | | |
|---|---|---|
| CN | 102340800 | 2/2012 |
| WO | WO 2011/034399 | 3/2011 |
| WO | WO 2011/142640 A2 | 11/2011 |

OTHER PUBLICATIONS

3GPP TSG RAN WG1 meeting #61 bis; Dresden, Germany; Source: Huawei; Title: Considerations for dynamic aperiodic SRS (R1-103897), Jun. 28-Jul. 2, 2010.

3GPP TSG RAN WG1 Meeting #63bis; Dublin, Ireland; Source: Ericsson/ST-Ericsson; Title: On the Configuration of SRS-Related parameters by DCI Format (R1-110454), Jan. 17-21, 2011.

3GPP TSG RAN WG1 meeting #68; Dresden, Germany; Source: Huawei, HiSilicon; Title: Enhancements of SRS for UL CoMP (R1-120039), Feb. 6-10, 2012.

Extended European Search Report for Application No./Patent No. 12874476.0-1851 / 2839707 PCT/CN2012074381, Nov. 9, 2015.

PCT International Search Report for International application No. PCT/CN2012/074381, Jan. 24, 2013.

3rd Generation Partnership Project; Technical Specification Group Radio Access Network; Evolved Universal Terrestrial Radio Access (E-UTRA); Multiplexing and channel coding (Release 10), 2011.

3GPP TSG-RAN Meeting #51; Kansas City, United States (RP-110448), Mar. 15-18, 2011.

3GPP TSG RAN WG1 #66; Athens, Greece (R1-112158), Aug. 22-26, 2011.

3GPP TSG RAN WG1 meeting #59; Jeju, South Korea (R1-094707), Nov. 9-13, 2009.

3GPP TSG RAN WG1 meeting #66; Athens, Greece (R1-112054), Aug. 22-26, 2011.

3rd Generation Partnership Project; Technical Specification Group Radio Access Network; Evolved Universal Terrestrial Radio Access (E-UTRA) Physical layer procedures (Release 10), 2011.

3rd Generation Partnership Project; Technical Specification Group Radio Access Network; Evolved Universal Terrestrial Radio Access (E-UTRA); Physical Channels and Modulation (Release 10), 2011.

\* cited by examiner

| Number of layers | Number of codewords | Codeword-to-layer mapping $i = 0,1,...,M_{symb}^{layer}-1$ | |
|---|---|---|---|
| 1 | 0 | $x^{(0)}(i) = 0$ | $M_{symb}^{layer} = M_{symb}^{(0)}$ |
| 2 | 0 | $x^{(0)}(i) = 0$ <br> $x^{(1)}(i) = 0$ | $M_{symb}^{layer} = M_{symb}^{(0)}/2$ |
| 4 | 0 | $x^{(0)}(i) = 0$ <br> $x^{(1)}(i) = 0$ <br> $x^{(2)}(i) = 0$ <br> $x^{(3)}(i) = 0$ | $M_{symb}^{layer} = M_{symb}^{(0)} = M_{symb}^{(1)}$ |

Fig. 5

| Zero codeword: |  |
| --- | --- |
| Codeword 0 disabled |  |
| Codeword 1 disabled |  |
| Bit field mapped to index | Message |
| 0 | 2 layers: TPMI=0 |
| 1-7 | Reserved |

Fig. 6

| Zero codeword: |  |
| --- | --- |
| Codeword 0 disabled |  |
| Codeword 1 disabled |  |
| Bit field mapped to index | Message |
| 0 | 4 layers: TPMI=0 |
| 1-63 | Reserved |

Fig. 7

SIGNALING FOR UPLINK SOUNDING

PRIORITY

This nonprovisional application is a U.S. National Stage Filing under 35 U.S.C. §371 of International Patent Application Serial No. PCT/CN2012/074381, filed Apr. 19, 2012 and entitled "Signaling for Uplink Sounding."

TECHNICAL FIELD

The present invention relates generally to wireless communication system, and more particularly, to the signaling design for uplink sounding in wireless communication system.

BACKGROUND

The $3^{rd}$ Generation Partnership Project (3GPP) Long Term Evolution, usually referred to as LTE, is a standard for wireless communication of high-speed data for mobile phones and data terminals, which is based on the GSM/EDGE and UMTS/HSPA network technologies. It is designed to better support mobile broadband Internet access by increasing the capacity and speed using new modulation techniques. Although commonly referred to as a type of 4G wireless service, LTE release 8, which is currently in use does not satisfy the requirements set forth by the ITU-R organization. Future releases of LTE (referred to as LTE Advanced) are expected to satisfy the requirements to be considered 4G.

Sounding techniques are commonly used in the uplink of LTE or LTE-A systems by the radio base stations, usually known as eNB or eNodeB, (where "e" stands for evolved) to estimate the uplink channel state at different frequencies. The channel-state estimates can then, for example, be used by the network scheduler to assign resource blocks of instantaneously good quality for uplink physical uplink shared channel (PUSCH) transmission, as well as to select different transmission parameters such as the instantaneous data rate and different parameters related to uplink multi-antenna transmission. Uplink sounding can also be used by the network to control the uplink transmit timing by means of the uplink-timing-alignment procedure.

In the current LTE or LTE-A systems, there has been designed reference signals that are used for sounding the uplink channel, referred to as Sounding Reference Signal (SRS). SRS is typically wideband in nature, since it is often used to probe a wide range of bandwidth. Base stations can then perform sounding by transmitting SRS to estimate the uplink channel state at different frequencies. Generally, SRS transmission could occur at regular time intervals or in an aperiodic manner.

However, with the development of LTE technology, the uplink sounding solutions with SRS turn out to be not adequate. For example, in LTE-advanced, as specified in 3GPP release 10, SRS resources are insufficient to support timely sounding since uplink channel states related to maximum 4 antennas need to be monitored. In the context of CoMP (coordinated multi-point transmission) in release 11, the problem becomes even worse, considering the SRS resources might be shared by all UEs.

Sounding is an important aspect in the uplink performance enhancement of a wireless communication system, such as the LTE system. To seek an efficient and cost-effective way of sounding, various substitutes for SRS techniques are being considered. However, there is essentially no viable scheme that can well fit in the existing architecture.

SUMMARY OF THE INVENTION

In light of the above, one of the objects of the present invention is to provide an improved solution for uplink sounding in a wireless communication system, which can be conveniently implemented without increasing computational complexity.

According to one embodiment of the invention the present invention relates to a method in a transmitting node in a wireless communication system for instructing a user terminal to perform uplink sounding, said method comprising: generating an uplink grant in a downlink control information (DCI) for instructing the user terminal to transmit an uplink channel with only a reference signal; and transmitting the DCI with said uplink grant to the user terminal, and wherein said uplink grant is configured as a redundant state within the DCI.

In another embodiment according to the present invention, the redundant state is able to indicate the disabled transmission of data blocks and control signaling on the uplink.

In yet another embodiment according to the present invention, the DCI is in DCI format-4, and the redundant state is the configuration of DCI format-4 indicating the disabled transmission of the transport blocks and the control state information (CSI) report on a physical uplink shared channel (PUSCH).

Another embodiment of the present invention relates to a method in a receiving node in a wireless communication system for performing uplink sounding, said method comprising: receiving a downlink control information (DCI) with an uplink grant from the network node; and enabling the transmission of an uplink channel with only a reference signal to the network node based on the uplink grant, wherein said uplink grant is configured as a redundant state within the DCI.

According to still another embodiment the present invention relates to a network node in a wireless communication system operative to instruct a user terminal to perform uplink sounding, comprising: a processing unit for generating an uplink grant in a downlink control information (DCI) for instructing the user terminal to transmit an uplink channel with only a reference signal; and a transmitting unit for transmitting the DCI with said uplink grant to the user terminal; wherein said uplink grant is configured as a redundant state within the DCI.

In still another embodiment the present invention relates to a user terminal in a wireless communication system operative to perform uplink sounding instructed by a network node, comprising: a receiving unit for receiving a downlink control information (DCI) with an uplink grant from the network node; and a processing unit for configuring the user terminal to transmit the uplink channel with only a reference signal according to the uplink grant, wherein said uplink grant is configured as a redundant state within the DCI.

In one embodiment according to the present invention, the user terminal has relaying functionality.

There is also one embodiment of the present invention that relates to a computer program product adapted to carry out the method as described above when run on a computer and a computer readable medium comprising computer executable program code adapted to carry out the steps in the method as described above.

The present invention provides an uplink sounding procedure based on the transmission of uplink channel with reference signal other than SRS, which could be triggered by the standard downlink control information as part of the scheduling grant. Such sounding procedure could be conducted in an aperiodic manner, supporting a timely estimate of the channel states without heavy resource burden. Since there is no need to define a new signaling format, not much extra standardization effort is required to bring the present solution into service. Furthermore, backward compatibility with the old releases of systems in use has been taken into consideration.

BRIEF DESCRIPTION OF THE DRAWINGS

The foregoing and other objects, features, and advantages of the invention will be apparent from the following more particular description of preferred embodiments as illustrated in the accompanying drawings, in which:

FIG. 5 is a table depicting the codeword-to-layer mapping for spatial multiplexing according to one embodiment of the present invention.

FIG. 6 is a table depicting the configuration of precoding information field in DCI format-4 for 2 antenna ports according to one embodiment of the present invention.

FIG. 7 is a table depicting the configuration of precoding information field in DCI format-4 for 4 antenna ports according to one embodiment of the present invention.

DETAILED DESCRIPTION

Figure 1:
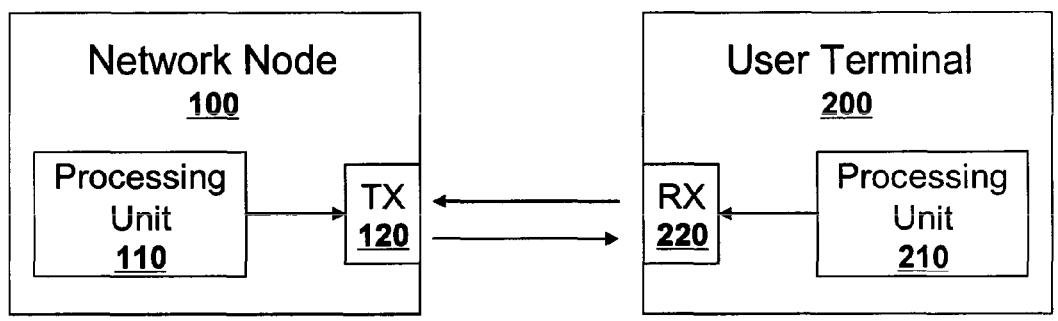
FIG. 1 is one functional block diagram illustrating a network node and a user terminal in a wireless communication network performing uplink sounding according to one embodiment of the present invention.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

Moreover, by way of a non-limiting example, the methods and arrangements of the present disclosure are illustrated by being used in LTE scenario. However, it should be understood that the teaching of the present disclosure can be applied to other kinds of wireless communication systems, such as other 3G or 4G systems with similar architecture, where uplink sounding procedure and its signaling is desired to get estimates of the channel.

FIG. 1 is the functional block diagram illustrating a network node and a user terminal in a wireless communication network performing uplink sounding according to one embodiment of the present invention. Network node 100, for example, is an access point or a base station, like an eNodeB (eNB) in a LTE system, while user terminal 200 could be a user equipment (UE), such as a cellular phone, a personal computer device, etc. These two parts are basic elements for a communication system to function properly, with several types of signals transmitted there between according to a certain protocol.

As illustrated in FIG. 1, network node 100 according to one embodiment of the present invention may comprise a processing unit 110 and a transmitting unit, TX 120. When uplink sounding is required to be performed, the processing unit 110 is operative to generate an uplink grant in a downlink control information (DCI) for instructing the user terminal 200 to transmit an uplink channel with only a reference signal. Then, transmitting unit TX would transmit the DCI with said uplink grant to the user terminal.

Correspondingly, user terminal 200 first receives the DCI with an uplink grant from the network node 100 through the receiving unit RX 220. Then, its processing unit 210 is operative to configure the user terminal to transmit the uplink channel with only a reference signal according to the uplink grant. With the help of the reference signal transmitted alone on the uplink channel, the network node 100 could conduct channel estimation conveniently and precisely.

From the sounding procedure described above, over can see that instead of using the conventional sounding reference signal, some existing reference signal, normally for other uses which is associated with a specific uplink channel has been adopted for sounding in such a way that only the reference signal itself is transmitted on its associated uplink channel without any other data or control signals. In order to trigger this kind of transmission, it is designed that at the side of a network node 100, downlink control signaling for the "normal" transmission of the uplink channel (i.e. with data and control signals) is employed to send the message that the user terminal 200 would transmit the uplink channel with the reference signal alone. More preferably, a redundant state within the existing downlink control information may be brought into service for this task. Said redundant state can be able to indicate the desired transmission of the reference signals as well as the disabled transmission of data and control signals on the uplink.

It can be seen that though a different way of sounding has been implemented here, no effort for creating a dedicated signaling between the network node and the user terminal in the existing architecture will be necessary, which otherwise could cause the computational complexity of the whole system to soar up and may not be transparent to the legacy equipments.

Figure 2:
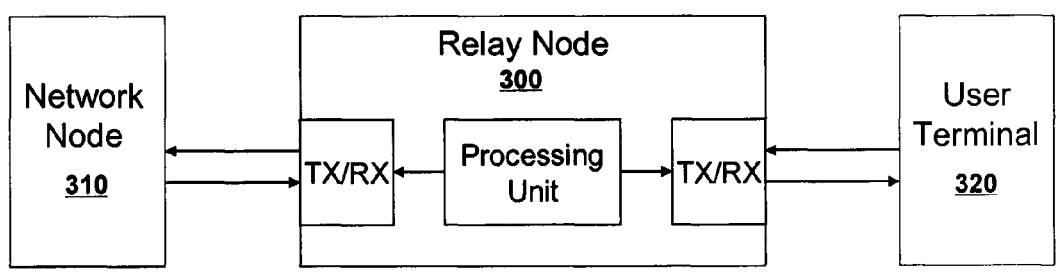
FIG. 2 is another functional block diagram illustrating a relay node in a wireless communication network performing uplink sounding according to one embodiment of the present invention.

It is to be understood that the present invention is not limited to the implementation with one network node and one user terminal as illustrated in FIG. 1. For example, it could also be implemented in the communication devices with relaying functionality acting as both transmitter and receiver according to the present disclosure at the same time, such as the relay node 300 illustrated in FIG. 2. The relay node 300 could communicate with both the network node 310 (e.g. a donor eNodeB) and the user terminal 320, wherein the link between the relay node 300 and the network node 310 is usually referred to as backhaul link while the link between the relay node 300 and the user terminal 320 is referred to as access link. In such situation, the present invention could also be implemented on both the backhaul link and the access link.

Figure 3:
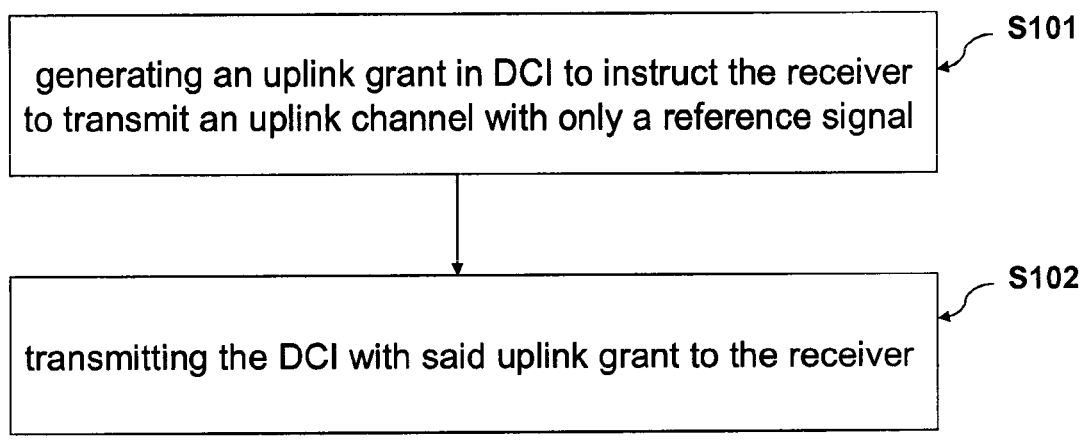
FIG. 3 is a flow diagram of performing uplink sounding in a network node according to one embodiment of the present invention.
Figure 4:
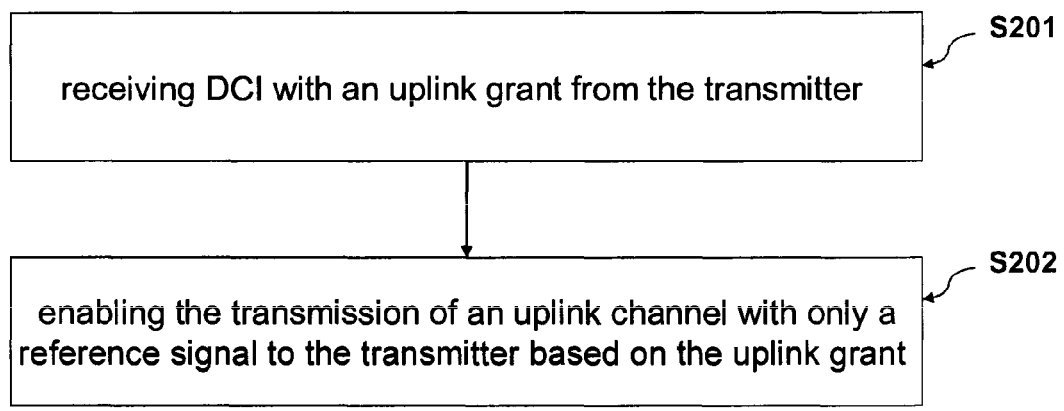
FIG. 4 is a flow diagram of performing uplink sounding in an user terminal according to one embodiment of the present invention.

One embodiment of the present invention in terms of the LTE system will be described in detail hereinafter with reference to FIG. 3 and FIG. 4, wherein FIG. 3 is a flow diagram of performing uplink sounding in a network node, and FIG. 4 is a flow diagram of performing uplink sounding in an user terminal.

For an LTE system to implement the aperiodic sounding procedure provided in the present disclosure, the network node (100), i.e., an eNB may first generate an uplink grant in DCI to trigger the transmission of an uplink channel with only a reference signal from the user terminal (200), i.e., an user equipment (UE), as illustrated in Step 101 in FIG. 3. In this situation, said reference signal could be the demodulation reference signal (DM-RS), which is usually transmitted by each UE with a physical uplink shared channel (PUSCH) to enable coherent demodulation for transmitted data or control signals at the eNB, as specified in release 8, 9 and 10 of LTE.

A UE could be configured for sounding on the physical resource blocks (PRBs) that are not used by any other UEs for PUSCH transmission, or PRBs that have been allocated to other UEs for PUSCH transmission. The latter case above can be viewed as a MU-MIMO pairing but with one UE that does not transmitting any data (except for DM-RS) on the PUSCH.

Generally in LTE systems, the UEs transmit signals conveying data or control information through a PUSCH, while the uplink scheduling information, also referred to as downlink control information (DCI) is conveyed to those UEs through a physical downlink control channel (PDCCH) from the base stations. There has been defined several DCI formats in LTE standards for the transmission of various DL control information, such as the downlink or uplink scheduling information, requests for CQI reports, power control commands. Different messages are sent in different formats through the PDCCH. The UEs listen for DCI messages and act according to the instructions contained therein.

For example, as defined in release 10 of LTE, DCI format 0 is used for the scheduling of PUSCH in one UL cell. DCI format 1 is used for the scheduling of one PDSCH codeword in one cell. DCI format 3 is used for the transmission of TPC commands for PUCCH and PUSCH with 2-bit power adjustments, and DCI format 4 is used for the scheduling of PUSCH in one UL cell with multi-antenna port transmission mode. To achieve the DM-RS based aperiodic sounding as described above, a proper DCI format is in need to convey the "empty" UL grant, which means the scheduling of PUSCH without any data (except for DM-RS) transmission.

Considering the requirements for the DM-RS based sounding to function effectively, DCI format 4 currently being used in the LTE system would be a preferable candidate to carry the without-data-transmission UL grant, which could guarantee the DM-RS sounding be UE specific and the sounding configuration be per TTI changeable, while the power of PUSCH be under good control. Compared to DCI format 0, which is also used for PUSCH scheduling, DCI format 4 has the flexibility to disable the transmission of both the transport blocks, which is desirable in the DM-RS based sounding procedure.

A DM-RS based sounding can thus be attained by scheduling the desired UE via DCI format 4 like what has been done for normal with-data UL grant, except that (within DCI format 4) the transmission of both transport blocks (TB) and the channel state information (CSI) reporting are disabled, i.e., both TB sizes equal to zero and no L1/L2 signaling.

For example, there is a 1 or 2 bits CSI request field in DCI format 4, which is used by the eNB to request for a CSI report from UE. A CSI report may consist of channel quality indicator (CQI), precoding matrix indicator (PMI), precoding type indicator (PTI), and/or rand indication (RI). CSI reporting could be periodic or aperiodic. The 2-bit field only applies to UEs that are configured with more than one DL cell. For an aperiodic CSI reporting with PUSCH triggered by the DCI format 4, if the CSI request field is 1 bit, a report is triggered for the serving cell when the CSI request field is set to '1'. If the CSI request field size is 2 bits, a report is triggered according to the value in the table below, as defined in release 10 of LTE.

TABLE 1

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

It then can be seen in Table 1 that the configuration of DCI format 4 for DM-RS sounding shall include setting the 1-bit CSI request field to '0' or setting a 2-bit CSI request field to '00'.

For the data transmission on a PUSCH, it is specified by the LTE standards that at most two transport blocks are allowed to be transmitted in one TTI. In the DM-RS based sounding procedure according to one embodiment, both of the two transport blocks shall be disabled. According to release 10 of LTE, to determine transport block size(s) in the physical downlink shared channel, the UE shall first read the 5-bit "modulation and coding scheme" field in the DCI. In DCI format 4, a transport block is disabled if the modulation and coding scheme (MCS) index is set to 28 and more than one physical resource blocks (PRB) are allocated, or if the MCS is set to 0 and only one PRB is allocated. Actually, release 10 of LTE, in its current form, allows for the disabling of both transport blocks, but such a case is usually avoided by the base station as abnormal scheduling.

With the setting above, DCI format 4 now can be used to schedule an uplink transmission without data on PUSCH. Notably, the signaling proposed by the present invention requires only minor changes to the computational complexity of UP to determine its behavior in response as compared to introducing a new DCI format, since no new transmission mode is indeed here.

When the DM-RS sounding is triggered by an uplink grant in DCI format 4, it could also allow for the transmission of non-precoded PUSCH. As defined in release 10 of LTE, DCI format 4 contains precoding information, which is determined by the transmitted precoding matrix indicator (TPMI) and the number of layers. To transmit a non-precoded PUSCH, the configuration of DCI format-4 may include setting TPMI to 0 and setting the layer number field to the number of antenna ports if the number of antenna ports at UE side for the PUSCH equals 2 or 4, so that an identity matrix would be selected for the precoding in the case of zero codeword.

Moreover, some reserved state within DCI format 4 may be used for future functionalities in DM-RS based sounding procedure, such as sounding with antenna selection. When the number of antenna ports at UE for the PUSCH equals to 2, by setting TPMI to 4 or 5 and setting the layer number field to 1, PUSCH transmission with antenna selection would be enabled for the demodulation reference signal.

With respect to other fields in DCI format 4, such as the carrier indicator, resource block assignment, TPC command for scheduled PUSCH, cyclic shift for DM RS and OCC index, UL index, no specific rules are set in the case of DM-RS sounding. Basically, it is desired that their settings would not prevent UE from getting the right message for the transmission of PUSCH without data. The eNB could still be able to control the power as well as the time and frequency resources for such transmission by means of these information fields.

After the configuration as described above, the downlink control information in its format 4 may be transmitted with the PUSCH to a UE by the eNB when an uplink sounding is required to be done, as illustrated in Step 102. The operations of UE in response to this control signaling will be described in detail below with respect to FIG. 4.

In Step 201, UE first receives the DCI with an uplink grant from the eNB, which may be in the DCI format 4, as described above. Same as the normal procedure for receiving DCI, UE would listen for DCI message without any priori knowledge regarding the formatting details used to transmit a given DCI message. To determine whether the DCI message is targeted to it and the DCI format being used, UE would conduct blind detection in a search space of DCI messages.

Upon the detection of the specific DCI format 4 message, the UE may enable the transmission of PUSCH with only DM-RS to the eNB based on information determined from said DCI message, as illustrated in S202. For example, Since no change have been made to the definition of each field in the DCI format, UE could obtain the instruction for the transmission of PUSCH without data in its usual way. For example, upon detecting that the CSI request field is set to 0, it may get the message that no CSI reporting is required. Similarly, by detecting the resource block assignment field and MCS index contained in the DCI message, UE may know that the two transport blocks should both be disabled. Finally, eNB may be able to estimate the uplink channel state based on the response from the UE to the DCI format 4 message.

In the LTE systems, to further ensure the proper UE behavior on receiving the DCI as described above, minor changes to the specifications are needed. FIG. 5 is a table depicting the codeword-to-layer mapping for spatial multiplexing according to one embodiment of the present invention. According to the LTE standards, the complex-valued modulation symbols for each of the codewords to be transmitted are mapped onto one or two layers. In this case, the number of codewords would be zero, since both of the two TB have been disabled, wherein one codeward corresponds to one TB which has experienced channel coding. Therefore, the codeword-to-layer mapping result, i.e. $x^{(v)}(i)$, and the number of modulation symbols per layer $M_{symb}^{layer}$ both shall equal to zero.

FIG. 6 is a table depicting the configuration of precoding information field in DCI format-4 for 2 antenna ports according to one embodiment of the present invention. As defined in release 10 of LTE, the number of bits for precoding information in DCI format 4 is 3 when the number of antenna ports at the UE is 2. In the case of DM-RS sounding, there is zero codeword, i.e. both codeword 0 and codeword 1 are disabled, as described above. When the 3 bits precoding information are set to 0, it represents the situation of non-precoded PUSCH transmission, as described above. The other settings could be reserved for future use, such as sounding with antenna selection.

FIG. 7 is a table depicting the configuration of precoding information field in DCI format-4 for 4 antenna ports according to one embodiment of the present invention. Similarly, as defined in release 10 of LTE, 6 bits are distributed for precoding information in DCI format 4 when there are 4 antenna ports at UE. Again, if the 6 bits precoding information are set to 0, it represents the situation of non-precoded PUSCH transmission. The other settings could be reserved for future use.

In such LTE implementation, the PDCCH with DCI format 4 ensures that the signaling for DM-RS based sounding is UE specific, and per TTI dynamic. The bandwidth allocation, frequency hopping configuration, and power control are also dedicated to one user equipment per TTI. It is backward compatible with carrier aggregation as well. Furthermore, the signaling method proposed applies for both TDD and FDD.

However, those skilled in the art would understand that the concept of the present disclosure could apply to other similar wireless communication systems as defined by e.g. the 3GPP standards According to one embodiment the present invention relates to a computer program product adapted to carry out the methods as described above when run on a computer.

Another embodiment of the present invention relates to a computer readable medium comprising computer executable program code adapted to carry out the steps of anyone of the methods as described above.

It should be noted that the aforesaid embodiments are illustrative of this invention instead of restricting it, substitute embodiments may be designed by those skilled in the art without departing from the scope of the claims below. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

The invention claimed is:

1. A method in a transmitting node in a wireless communication system for instructing a user terminal to perform uplink sounding, said method comprising:
generating, by the transmitting node, an uplink grant in a downlink control information (DCI) for instructing the user terminal to transmit an uplink channel with only a reference signal; and
transmitting, by the transmitting node, the DCI with the uplink grant to the user terminal, wherein:
the uplink grant is configured as a redundant state within the DCI; and
the redundant state is able to indicate the disabled transmission of data blocks and control signaling on the uplink.

2. The method according to claim 1, wherein the DCI is in DCI format-4, and the redundant state is the configuration of DCI format-4 indicating the disabled transmission of the transport blocks and the control state information (CSI) report on a physical uplink shared channel (PUSCH).

3. The method according to claim 2, wherein said configuration of DCI format-4 including a 1-bit CSI request field set to '0' or a 2-bit CSI request field set to '00'.

4. The method according to claim 3, wherein said configuration of DCI format-4 including the modulation and coding scheme (MCS) index set to 28 if more than one physical resource blocks (PRB) are allocated, or the MCS set to 0 if only one PRB is allocated.

5. The method according to claim 4, wherein said configuration of DCI format-4 further including the transmitted precoding matrix indicator (TPMI) set to 0 and the layer number field set to the number of antenna ports if the number of antenna ports for the PUSCH equals 2 or 4 to enable the transmission of non-precoded PUSCH.

6. The method according to claim 4, wherein said configuration of DCI format-4 further including the transmitted precoding matrix indicator (TPMI) set to 4 or 5 and the layer number field set to 1 when the number of antenna ports for the PUSCH equals to 2 to enable the transmission of PUSCH transmission with antenna selection.

7. A method in a receiving node in a wireless communication system for performing uplink sounding, said method comprising:
receiving, by the receiving node, a downlink control information (DCI) with an uplink grant from the network node; and
enabling, by the receiving node, the transmission of an uplink channel with only a reference signal to the network node based on the uplink grant,
wherein:
the uplink grant is configured as a redundant state within the DCI; and
the redundant state is able to indicate the disabled transmission of all the data blocks and control signaling on the uplink.

8. The method according to claim 7, wherein the DCI is in DCI format-4, and the redundant state is the configuration of DCI format-4 indicating the disabled transmission of all the transport blocks and the control state information (CSI) report on a physical uplink shared channel (PUSCH).

9. The method according to claim 8, wherein said configuration of DCI format-4 including a 1-bit CSI request field set to '0' or a 2-bit CSI request field set to '00'.

10. The method according to claim 9, wherein said configuration of DCI format-4 including the modulation and coding scheme (MCS) index set to 28 if more than one physical resource blocks (PRB) are allocated, or the MCS set to 0 if only one PRB is allocated.

11. The method according to claim 9, further comprising enabling the transmission of non-precoded PUSCH if said configuration of DCI format-4 further including the transmitted precoding matrix indicator (TPMI) set to 0 and the layer number field set to the number of antenna ports if the number of antenna ports for the PUSCH equals 2 or 4.

12. The method according to claim 9, further comprising enabling the PUSCH transmission with antenna selection if said configuration of DCI format-4 further including the transmitted precoding matrix indicator (TPMI) set to 4 or 5 and the layer number field set to 1 when the number of antenna ports for the PUSCH equals to 2.

13. A network node in a wireless communication system operative to instruct a user terminal to perform uplink sounding, comprising:
a processing unit for generating an uplink grant in a downlink control information (DCI) for instructing the user terminal to transmit an uplink channel with only a reference signal; and
a transmitting unit for transmitting the DCI with said uplink grant to the user terminal;
wherein:
the uplink grant is configured as a redundant state within the DCI; and
the redundant state is able to indicate the disabled transmission of data blocks and control signaling on the uplink.

14. A user terminal in a wireless communication system operative to perform uplink sounding instructed by a network node, comprising:
a receiving unit for receiving a downlink control information (DCI) with an uplink grant from the network node; and
a processing unit for configuring the user terminal to transmit the uplink channel with only a reference signal according to the uplink grant,
wherein:
the uplink grant is configured as a redundant state within the DCI;
the redundant state is able to indicate the disabled transmission of data blocks and control signaling on the uplink.

15. A user terminal according to claim 14, wherein the user terminal has relaying functionality.

* * * * *